United States Patent [19]

Johnson

[11] Patent Number: 4,618,116

[45] Date of Patent: Oct. 21, 1986

[54] QUICK LATCH MOUNTING BRACKET

[75] Inventor: Allen L. Johnson, Mukwonago, Wis.

[73] Assignee: RTE Corporation, Brookfield, Wis.

[21] Appl. No.: 621,452

[22] Filed: Jun. 18, 1984

[51] Int. Cl.⁴ .............................................. F16M 13/00

[52] U.S. Cl. .............................. 248/222.1; 174/158 R; 248/231.2; 403/297; 403/358; 403/409.1

[58] Field of Search ............ 211/26; 248/222.1, 231.2, 248/231.3, 224.3, 225.1; 403/409.1, 297, 358; 174/158 R

[56] References Cited

U.S. PATENT DOCUMENTS 1,363,321 12/1920 Jaeger .......................... 248/222.1 X 3,190,601 6/1965 Williams .......................... 248/231.3

4,049,230 9/1977 Minniear ...................... 248/231.3 X 4,430,019 2/1984 D'Alessio .......................... 403/409.1

*Primary Examiner*—Robert W. Gibson, Jr.

*Attorney, Agent, or Firm*—Andrus, Sceales, Starke & Sawall

[57] ABSTRACT

A quick latch mounting device for securing a standoff device to a standoff bracket used in electrical power distribution systems. The mounting device includes a mounting member attachable to the standoff device and movable in a horizontal plane between a first position clamped to the bracket and a second unclamped position, and an actuator having either a cam or a lever for movement in a vertical plane. A clamping member is carried by the mounting member and operatively couples the actuator and the mounting member. The clamping member is slidably movable relative to the mounting member along oblique sliding interfaces to translate the vertical movement of the actuator into the horizontal movement of the mounting member so that the mounting member may be firmly clamped or unclamped to the bracket.

20 Claims, 7 Drawing Figures

FIG. 1
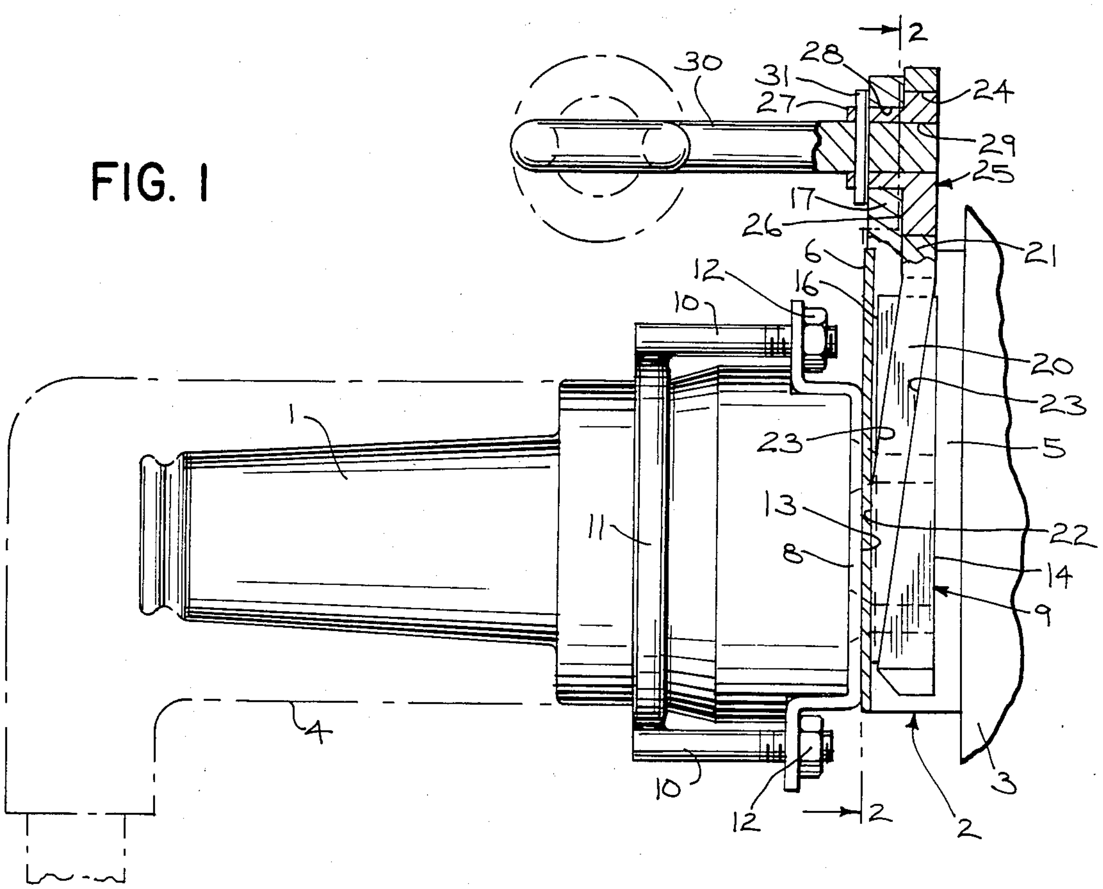
FIG. 2
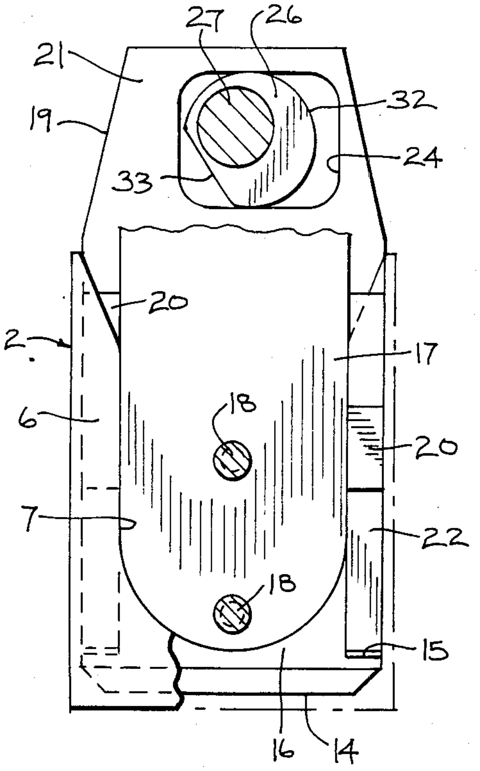
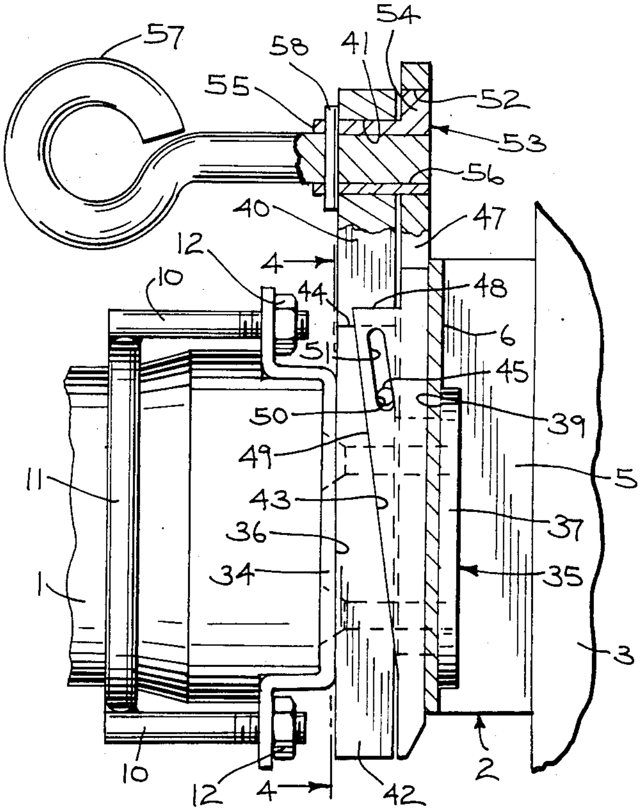
FIG. 3

QUICK LATCH MOUNTING BRACKET

BACKGROUND OF THE INVENTION

The present invention relates to mounting devices, and more particularly to a quick latch mounting device for securely clamping a standoff device to a standoff bracket used in electrical power distribution systems.

Standoff apparatus provides a structure for mounting a standoff bushing to the housing of an electrical power distribution system, such as a pad-mounted transformer. The standoff bushing in turn provides a site for connecting a removable elbow terminator which is the main connection for distributing electrical power to a transformer from the power source.

Present standoff apparatus includes a mounting plate for holding the bushing that is receivable within a pocket formed in the standoff bracket. The standoff bracket is directly attached to either the transformer housing or to a loadbreak connector bracket which in turn is attached to the housing. The mounting plate for the bushing includes a flanged portion having a surface engageable with the inside of the standoff bracket, and a threaded eye-bolt which is turned down against the transformer housing or loadbreak connector bracket to force the flanged portion to tighten against the inside of the standoff bracket and hold the bushing in the standoff pocket. In order the accomplish this, however, the eye-bolt must be turned by a lineman using a long "hot stick" from a position remote from the standoff apparatus. As a result, it takes considerable time to screw the eye-bolt in and tighten the mounting plate in the pocket of the standoff bracket. Also, as the eye-bolt is turned in to clamp the bushing to the standoff bracket, the mounting plate becomes canted within the standoff bracket causing the outer end of the bushing to move outwardly and downwardly with respect to the standoff bracket. This at times causes the lineman to have difficulties in aligning the "hot stick" with the elbow terminator for its removal and insertion on the bushing, and with the eye-bolt for mounting and removing the bushing.

SUMMARY OF THE INVENTION

A quick latch mounting device for securely clamping a standoff device to a standoff bracket used in electrical power distribution systems.

The quick latch moving device includes an actuator means having an actuator member movable in a first plane, a mounting member attachable to the standoff device and movable in a second plane transverse to the first plane between a first position clamped to the standoff bracket and a second position unclamped with respect to the standoff bracket, and a clamping member operatively coupled to the actuator member and the mounting member. The clamping member is operable upon movement of the actuator member to translate the movement of the actuator member in the first plane into the movement of the mounting member in the second plane to clamp and unclamp the mounting member to the standoff bracket.

The mounting member includes a bracket portion attachable to the standoff device that includes a first abutment surface, and a mounting portion connected to the bracket portion that includes a second abutment surface spaced from and in opposition to the first abutment surface. In the clamped position of the mounting member, one of the abutment surfaces engages and bears against the standoff bracket to firmly hold and clamp the mounting member and standoff bracket together. In the unclamped position, the said one abutment surface is disengaged from the standoff bracket in order to permit removal of the standoff device and mounting member from the standoff bracket.

The clamping member is carried by the mounting member and is slidably movable relative thereto along an oblique sliding interface between a first engaged position and a second disengaged position. In the engaged position, the clamping member secures the mounting member in its clamped position, and in the disengaged position the clamping member releases the mounting member to its unclamped position. The oblique sliding interfaces may be formed by oblique slots formed in the clamping member that slidably receive pins projecting from the mounting member, or by mating oblique surfaces formed in both the mounting member and clamping member. The clamping member forces the mounting member to move in a horizontal plane that is transverse to the vertical movement of the actuator member so that the said one abutment surface of the mounting member firmly engages a surface of the standoff pocket. This action eliminates the alignment problems previously encountered by linemen using hot sticks, and provides a mechanism for firmly clamping the standoff device to the standoff bracket since the entire surface area of the said one abutment surface engages and bears against a surface of the standoff bracket.

The actuator means is carried by the mounting member, and includes either cam means or lever means operable upon rotation to move the clamping member between its engaged and disengaged positions. The actuator member need only be rotated $\frac{1}{2}$ to $\frac{3}{4}$ turns in order to clamp or unclamp the standoff device to the standoff bracket. This substantially reduces the amount of time needed by a lineman using a hot stick to attach or remove the standoff bushing.

BRIEF DESCRIPTION OF THE DRAWINGS

The drawing illustrates the best mode presently contemplated of carrying out the invention.

In the drawings:

FIG. 1 is a fragmentary side view in elevation with parts broken away and in section illustrating a first embodiment of the quick latch mounting device of the present invention;

FIG. 2 is a front view with parts broken away taken along the plane of the line 2—2 in FIG. 1;

FIG. 3 is a fragmentary side view in elevation illustrating a second embodiment of the quick latch mounting device of the present invention;

DESCRIPTION OF THE PREFERRED EMBODIMENTS

Figure 4:
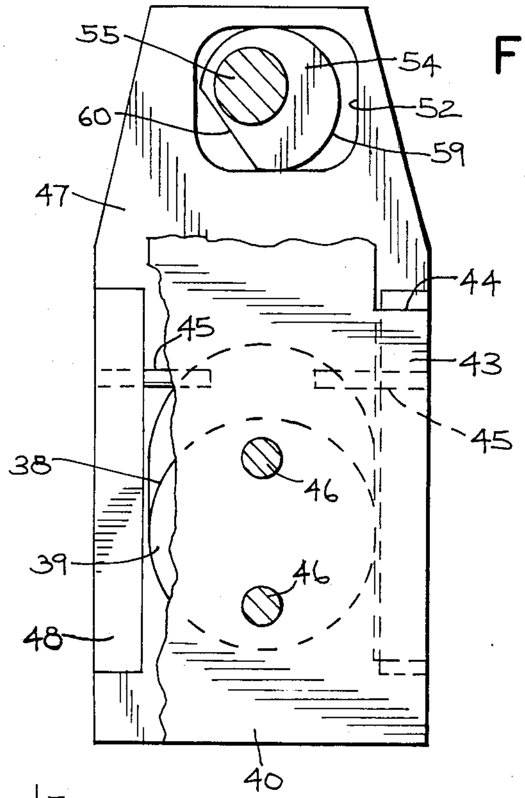
FIG. 4 is a front view with parts broken away taken along the plane of the line 4—4 in FIG. 3.

Referring to the drawings, FIGS. 1 and 2 illustrate a first embodiment of a quick latch mounting device constructed in accordance with the principles of the present invention. The quick latch mounting device is employed to releasably mount a standoff device or bushing 1 to a standoff bracket 2 which is attached to a surface of a support structure 3 such as the housing of a pad mounted transformer for distributing electrical power, or a loadbreak connector bracket which in turn is mounted on the transformer housing. Bushing 1 in turn is connectable to an elbow terminator 4 (shown in phantom lines in FIG. 1) which is the main connection for distributing electrical power to a transformer from a power source.

Standoff bracket 2 includes a pair of spaced apart side walls 5 interconnected at their outer edges by a front wall 6. The inner edges of side walls 5 are welded or otherwise attached to the supporting surface of structure 3 so that front wall 6 is spaced from the surface of structure 3 and disposed in a plane generally parallel thereto. As seen best in FIG. 2, front wall 6 includes a pocket 7 that opens upwardly to enable the quick latch mounting device of the present invention to be received therein. Pocket 7 is defined at its lower end by an arcuate shaped edge, at its upper end by a pair of diverging edges and along its intermediate portion by a pair of opposing, spaced apart, parallel edges which interconnect the divergent upper edges with the arcuate shaped lower edge. As shown best in FIG. 1, bracket 2 is open at its upper and lower ends.

The quick latch mounting device includes a mounting member having a bracket portion 8 that is attachable to standoff device or bushing 1, and a mounting portion 9 that is receivable within pocket 7 of standoff bracket 2. Bracket portion 8 includes a pair of spaced apart flanges interconnected by a flat web portion to form a channel-shaped plate member for receiving the inner end of standoff bushing 1. The terminal ends of each flange of portion 8 are flared outwardly and each of these outwardly flanged portions receive a bolt member 10 that has a threaded inner end and an outer end that is welded or otherwise attached to a retaining ring 11. Retaining ring 11 has a diameter that is less than the inner end of bushing 1 so that as a pair of nuts 12 are turned down on the threaded ends of members 10 against the outwardly flanged portions of bracket portion 8 bushing 1 is securely attached to portion 8. The inner face of the bracket portion 8 defines an abutment surface 13 that extends parallel to the outer surface of front wall 6 of bracket 2.

Mounting portion 9 of the mounting member includes a rectangular shaped base 14 that is receivable within standoff bracket 2. As shown best in FIG. 2, base 14 is dimensioned so that its outside width is slightly less than the inside width of standoff bracket 2, i.e. the distance between side walls 5. Base 14 thus will not rotate once positioned within standoff bracket 2. Base 14 includes a channel 15 formed in each of its sides extending at an oblique angle with respect to front wall 6 of standoff bracket 2 from the upper rear edge of base 14 to the lower front edge of base 14 (see FIG. 1). As shown best in FIG. 2, the depth of each channel 15 extends from the outer surface of each side of base 14 to a point which is substantially parallel to the intermediate edges that define pocket 7. Each channel 15 defines a pair of opposing oblique sliding surfaces, the purpose of which will hereinafter be described. Base 14 also includes an abutment surface 16 defined by its front surface that is spaced from and in opposition to abutment surface 13 of bracket portion 8. Abutment surfaces 13 and 16 are both parallel to each other and to the opposite sides of front wall 6 of standoff bracket 2. Mounting portion 9 also includes an integral landing 17, seen best in FIG. 2, that projects from abutment surface 16, and extends upwardly above the top edge of base 14. Landing 17 provides the structure that separates abutment surfaces 13 and 16 and that engages the edges of pocket 7 to support the mounting member in standoff bracket 2. As seen best in FIG. 2, landing 17 is dimensioned to substantially correspond to the dimensions of the intermediate and lower portions of pocket 7 and thus includes an arcuate shaped lower end which engages the arcuate shaped lower end of pocket 7 and a pair of opposite and parallel sides which engage the intermediate edges of pocket 7.

Base 14 and landing 17 are connected to bracket portion 8 by means of a pair of screws 18 that extend through the web of bracket portion 8 into landing 17 and base 14. The space between abutment surfaces 13 and 16, as defined by the height of landing 17, is slightly greater than the width of front wall 6 of standoff bracket 2. This spacing in combination with the divergent upper edges of pocket 7 enable a lineman to easily slide the mounting member in position over the top edge of front wall 6 of standoff bracket 2 so that abutment surfaces 13 and 16 are disposed on opposite sides of front wall 6.

The quick latch mounting device also includes a clamping member 19 carried by base 14 and slidably movable relative thereto between a first engaged position that secures the mounting member in a clamped position and a second disengaged position that releases the mounting member to an unclamped position. As shown best in FIG. 2, clamping member 19 is U-shaped and includes a pair of elongate legs 20 and a body 21 connected to legs 20. Legs 20 are parallel to one another and spaced apart a distance equal to the distance between channels 15 in base 14. Legs 20 are slidably receivable in channels 15 and have a width substantially equal to the depth of channels 15 so that when clamping member 19 is received within base 14 the outer side surfaces of legs 20 are flush with the side surfaces of base 14. As shown best in FIG. 1, legs 20 are disposed at an oblique angle of about 8° with respect to body 21, and the lower end of each leg 20 includes a wedge surface 22 that extends parallel to abutment surfaces 13 and 16 and front wall 6 of standoff bracket 2. The elongate surfaces of legs 20 and channels 15 form oblique sliding interfaces 23 in which clamping member 19 slidably moves. Body 21 extends above legs 20 to be substantially parallel to front wall 6 of bracket 2, and includes a rectangular shaped opening 24 formed therethrough.

The quick latch mounting device also includes an actuator means carried by landing 17 and rotatably mounted thereon. The actuator means is operable upon rotation to move clamping member 19 between its engaged and disengaged positions. The actuator means includes an actuator member 25 in the form of a cam means which includes a cam portion 26 received within an opening 24 in body 21 of clamping member 19 and a sleeve portion 27 integral with cam portion 26 and receivable within an opening 28 formed at the upper end of landing 17. Actuator member 25 is preferably formed of a self-lubricating material such as that available under the trade designation "Delrin". Actuator member 25 includes a central opening 29 which receives the end of an eye-bolt 30. Member 25 is connected to eye-bolt 30 for coincident rotation therewith by means of a pin 31 extending through sleeve portion 27 and the inner end of eye-bolt 30. As shown best in FIG. 2, member 25 is eccentrically mounted on eye-bolt 30 with its outer surface 32 forming a cam surface engageable with the lower edge of opening 24 in body 21 of clamping member 19. Surface 32 includes a flat portion 33 the purpose of which will hereinafter be described. Thus, rotation of eye-bolt 30 results in the rotation of actuator member 25 in a vertical plane to move clamping member 19 between its engaged and disengaged positions. Clamping member 19 thus operatively couples actuator member 25 and the mounting member for bushing 1 and is operable upon movement of actuator 25 in a vertical plane to translate this vertical movement into movement in a horizontal plane for the mounting member and bushing 1.

In operation, the mounting member for bushing 1 is shown in FIGS. 1 and 2 in its clamped position, and clamping member 19 is shown in its engaged position. In order to move clamping member 19 to its disengaged position and the mounting member to its unclamped position, eye-bolt 30 is rotated by a lineman using a hot stick in a counterclockwise direction (as shown in FIG. 2) to the position shown in phantom lines in FIG. 1. Rotation of eye-bolt 30 causes flat portion 33 of cam surface 32 to be moved to a position parallel to the lower edge of opening 24 in body 21 of clamping member 19. In this position, flat portion 33 is no longer engaged with the edge of opening 24 but instead is spaced therefrom so that downward pressure on clamping member 19 is released thus enabling legs 20 of clamping member 19 to be slid upwardly along interfaces 23 to release the mounting member to its unclamped position. The mounting member, bushing 1, and clamping member 19 may then be removed as a unit from standoff bracket 2.

In order to clamp bushing 1 on standoff bracket 2, the reverse procedure is performed. In order to accomplish this, the mounting member is slid down over the top edge of front wall 6 of standoff bracket 2 so that front wall 6 is positioned between abutment surfaces 13 and 16, as shown in FIG. 1. However, unlike FIG. 1, neither abutment surface 13 nor abutment surface 16 bears tightly against the sides of front wall 6, but instead are loosely positioned with respect thereto. Eye-bolt 30 is then rotated in a clockwise manner approximately ½ to ¾ turns to the position shown in solid lines in FIG. 1 so that cam surface 32 engages the bottom edge of opening 24 in body 21 of clamping member 19 and moves clamping member 19 downwardly so that legs 20 slide along interfaces 23. Legs 20 act as reaction members to move bushing 1 and its mounting member into their clamped positions. As clamping member 19 is slid downwardly, wedge surface 22 of each leg 20 engages the inside surface of front wall 6 of bracket 2 and forces bushing 1 and its mounting member inwardly until abutment surface 13 engages and bears against the outside surface of front wall 6 to firmly hold bushing 1 and its mounting member to standoff bracket 2. Since wedge surfaces 22 engage the inside surface of front wall 6 on opposite ends thereof adjacent side walls 5, bushing 1 and its mounting member are moved horizontally in a plane that is transverse to the vertical plane of movement of actuator member 25. This eliminates any tilting or tipping of the outer end of bushing 1 so that a lineman may more readily align a hot stick with elbow terminator 24 and eye-bolt 30.

Figure 5:
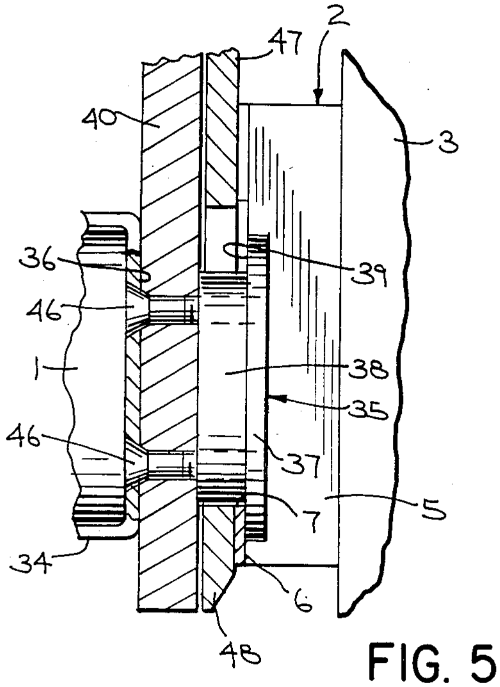
FIG. 5 is a side view similar to FIG. 3 with parts broken away and in section.

Turning now to FIGS. 3–5, there is shown a second embodiment of the quick latch mounting device constructed in accordance with the principles of the present invention. In this embodiment, the quick latch mounting device includes a mounting member having a bracket portion 34 that is attachable to standoff bushing 1, and a mounting portion 35 that is receivable within pocket 7 of standoff bracket 2. Bracket portion 34 is identical in structure with bracket portion 8 of the first embodiment and mounts bushing 1 thereto in an identical manner to that illustrated in FIG. 1. The inner face of bracket portion 34 defines an abutment surface 36 that extends parallel to the outer surface of front wall 6 of bracket 2.

Mounting portion 35 of the mounting member for the second embodiment includes a circular shaped base 37 that is receivable within standoff bracket 2. Base 37 is in the form of a flat disc and is dimensioned so that its outside diameter is slightly less than the inside width of standoff bracket 2, i.e. the distance between sidewalls 5, but is greater than the width of pocket 7. Base 37 is thus able to rotate even when positioned within standoff bracket 2. This feature enables easier assembly of the mounting member to the standoff bracket 2 in applications where only minimal clearances are available. Base 37 includes an integral circular hub 38 projecting outwardly therefrom toward bracket portion 34. Hub 38 has a diameter that is slightly less than the diameter of base 37, and this difference defines an annular abutment surface 39 on the outer face of base 37. Hub 38 provides one of the structures that separates abutment surfaces 36 and 39 ant that engages the edges of pocket 7 to support the mounting member in standoff bracket 2. Hub 38 is dimensioned to substantially correspond to the dimensions of the arcuate shaped lower end of pocket 7 so that the lower end of hub 38 sits flush on the lower edge of pocket 7, as shown in FIG. 5.

A mounting plate 40 is disposed between hub 38 and bracket portion 34. Mounting plate 40 extends upwardly beyond the top edge of front wall 6 of bracket 2 and includes a circular opening 41 formed therethrough at its upper end. Mounting plate 40 includes a flared section 42 projecting outwardly from each of its sides to define a sliding surface 43 which is disposed at an oblique angle with respect to front wall 6 of standoff bracket 2. As seen best in FIG. 3, the upper end of portions 42 define a shoulder 44 and the sliding surface extends downwardly and inwardly toward wall 6 from shoulder 44 to the lower portion of mounting plate 40. Mounting plate 40 also includes a pin 45 adjacent surface 43 projecting outwardly from each of its sides in the same direction as sections 42. The purpose of pins 45 will hereinafter be described.

Base 37, hub 38 and mounting plate 40 are connected to bracket portion 34 by means of a pair of screws 46 that extend through the web of bracket portion 34 and openings formed in mounting plate 40 into hub 38 and base 37. As in the first embodiment, abutment surfaces 36 and 39 of this second embodiment are spaced from and in opposition to one another, and are both parallel to each other and to the opposite sides of front wall 6 of standoff bracket 2.

The quick latch mounting device shown in FIGS. 3–5 also includes a clamping member 47 carried by mounting plate 40 and located between plate 40 and wall 6 of bracket 2. Clamping member 47 is slidably movable relative to plate 40 between a first engaged position that secures the mounting member in a clamped position on bracket 2 and a second disengaged position that releases the mounting member to an unclamped position. Clamping member 47 is in the form of a flat plate having a wedge surface 85 disposed parallel with and in opposition to the outer surface of front wall 6 of bracket 2, and a pair of spaced apart elongate legs 48 located at its lower end along its opposite side edges. Legs 48 project outwardly i.e. to the left in FIG. 3, and form a pair of runners that are slidably receivable in the channels formed by sections 42 in mounting plate 40. Legs 48 have a width substantially equal to the depth of sections 42 so that the outer side surfaces of legs 48 are flush with the side surfaces of mounting plate 40. Each leg 48 includes a sliding surface 49 located at its outer edge that are inclined at an oblique angle of about 8° and that extend parallel to sliding surfaces 43. Each leg 48 includes a slot 51 formed therethrough at its upper end which has a longitudinal axis parallel to sliding surface 49, and as shown in FIG. 3, are dimensioned to slidably receive pins 45. The edges of slots 51 and the outer surfaces of pins 45 together with sliding surfaces 43 and 49 form oblique sliding interfaces 50 in which clamping member 47 slidably moves. The upper end of clamping member 47 extends parallel to mounting plate 40, and includes a rectangular shaped opening 52 formed therethrough.

The quick latch mounting device shown in FIGS. 3–5 also includes an actuator means carried by mounting plate 40 and rotatably mounted thereon. The actuator means is operable upon rotation to move clamping member 47 between its engaged and disengaged positions. The actuator means includes an actuator member 53 in the form of a cam means having a structure identical to that of actuator member 25. Thus, actuator member 53 includes a cam portion 54 received within opening 52 in clamping member 47 and a sleeve portion 55 integral with cam portion 54 and receivable within opening 41 in mounting plate 40. Actuator member 53 includes a central opening 56 which receives the end of an eye-bolt 57. Member 53 is connected to eye-bolt for coincident rotation therewith by means of a pin 58 extending through sleeve portion 55 and the inner end of eye-bolt 57. As shown best in FIG. 4, member 53 is eccentrically mounted on eye-bolt 57 with its outer surface 59 forming a cam surface engageable with the lower edge of opening 52 in clamping member 47. Surface 57 includes a flat portion 60 the purpose of which will hereinafter be described. Thus, rotation of eye-bolt 57 results in the rotation of actuation member 53 in a vertical plane to move clamping member 47 between its engaged and disengaged positions. Clamping member 47 thus operatively couples actuator member 53 and the mounting member for bushing 1, and is operable upon movement of actuator 53 in a vertical plane to translate this vertical movement into movement in a horizontal plane for the mounting member in bushing 1.

In operation, the mounting member is shown in FIG. 3 in its unclamped position, and in FIGS. 4 and 5 in its clamped position with clamping member 47 shown in its engaged position. In order to move clamping member 47 to its disengaged position and the mounting member to its unclamped position, eye-bolt 57 is rotated by alignment using a hot stick in a clockwise direction (as shown in FIG. 4). Rotation of eye-bolt 57 causes flat portion 60 of cam surface 59 to be moved to a position parallel to the lower edge of opening 52 in clamping member 47 (FIG. 3). In this position, flat portion 60 is no longer engaged with the edge of opening 52 but instead is spaced therefrom so that downward pressure on clamping member 47 is released thus enabling legs 48 to be slid upwardly along interfaces 50 to release the mounting member to its unclamped position. The mounting member, bushing 1, and clamping member 47 may then be removed as a unit from standoff bracket 2.

In order to clamp bushing 1 on standoff bracket 2, the reverse procedure is performed. In order to accomplish this, the mounting member is slid down over the top edge of front wall 6 of standoff bracket 2 so that front wall 6 is positioned between wedge surface 85 of clamping member 47 and abutment surface 39, as shown in FIG. 5. However, at this point, neither wedge surface 85 of clamping member 47 nor abutment surface 39 bears tightly against the sides of front wall 6, but instead are loosely positioned with respect thereto. Eye-bolt 57 is then rotated in a clockwise manner approximately ½ to ¾ turns from the position shown in FIG. 3 to the position shown in FIG. 4 so that cam surface 59 engages the bottom edge of opening 52 in clamping member 47 and moves clamping member 47 downwardly so that legs 48 slide along interfaces 50. Legs 50 and pins 45 act as reaction members to move bushing 1 and its mounting member into their clamped positions. As clamping member 47 is slid downwardly, surface 49 of each leg 48 engages the sliding surface 43 of each section 42 and forces wedge surface 85 inwardly against the outside surface of wall 6, and bushing 41 and its mounting member outwardly until abutment surface 39 engages and bears against the inside surface of front wall 6 to firmly hold bushing 1 and its mounting member to standoff bracket 2. This action moves bushing 1 and its mounting member horizontally in a plane that is transverse to the vertical plane of movement of actuator member 53. As in the first embodiment, this action eliminates any tilting or tipping of the outer end of bushing 1.

Figure 6:
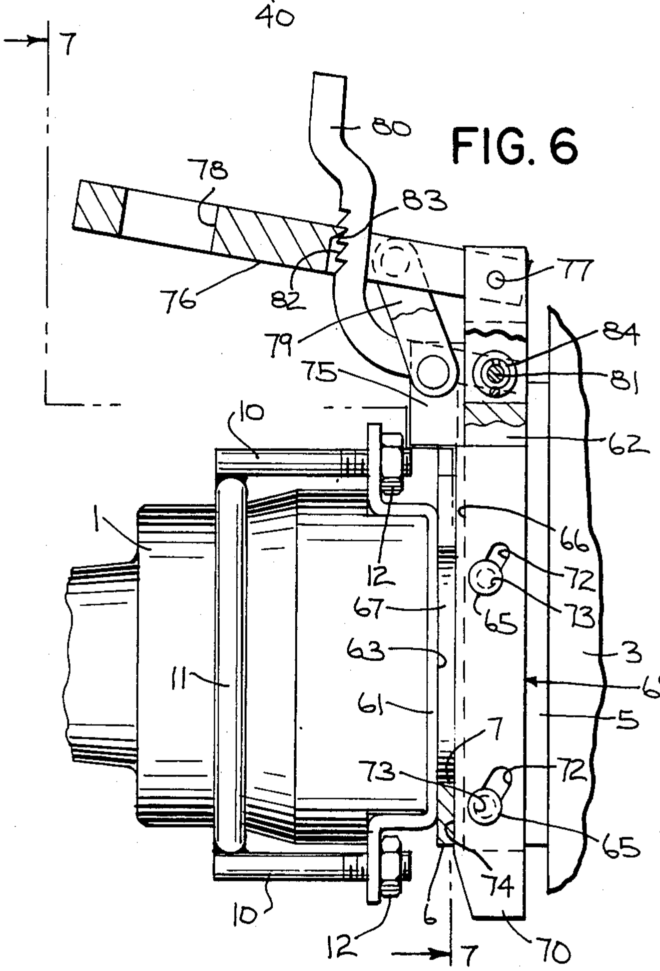
FIG. 6 is a fragmentary side view in elevation illustrating a third embodiment of the quick latch mounting device of the present invention.
Figure 7:
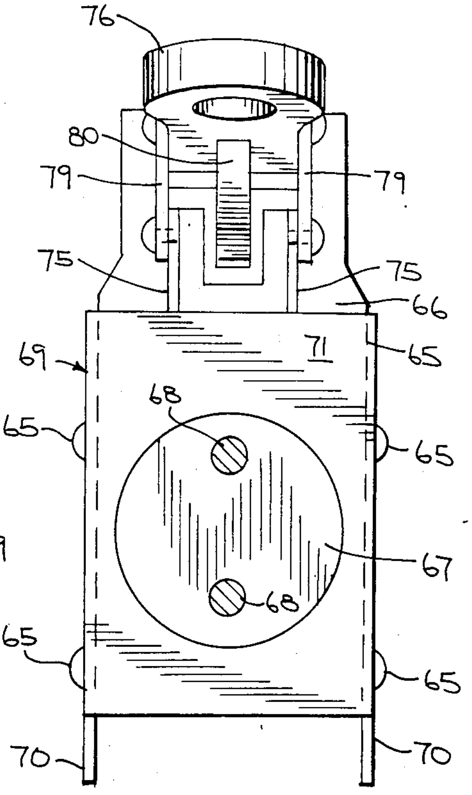
FIG. 7 is a front view taken along the plane of the line 7—7 in FIG. 6.

Referring now to FIGS. 6 and 7, there is shown a third embodiment of the quick latch mounting device of the present invention. In this third embodiment the quick latch mounting device includes a mounting member having a bracket portion 61 that is attachable to standoff bushing 1, and a mounting portion 62 that is receivable within pocket 7 of standoff bracket 2. Bracket portion 61 is identical in structure to that of bracket portions 8 and 34 of the respective first and second embodiments described herein so that the inner face of portion 61 defines an abutment surface 63 that extends parallel to the outer surface of front wall 6 of bracket 2.

Mounting portion 62 of the mounting member includes a rectangular shaped base 64 that is receivable within standoff bracket 2. Base 64 is dimensioned so that its width is slightly less than the inside width of standoff bracket 2, i.e. the distance between sidewalls 5. Base 64 thus will not rotate once positioned within standoff bracket 2. Base 64 includes a pair of headed pins 65 projecting therefrom, one near the top and the other near the bottom of each of its sides. Base 64 also includes an abutment surface 66 defined by its front surface that is spaced from and in opposition to abutment surface 63 of bracket portion 61. Abutment surfaces 63 and 66 are both parallel to each other and to the opposite sides of front wall 6 of standoff bracket 2. Mounting portion 62 also includes an integral hub 67 that projects from abutment surface 66 to engage abutment surface 63. Hub 67 provides the structure that separates abutment surfaces 63 and 66 and that engages the edges of pocket 7 to support the mounting member in standoff bracket 2. Hub 67 is circular in shape and is dimensioned to substantially correspond to the dimensions of the lower end of pocket 7 to mate therewith.

Base 64 and hub 67 are connected to bracket portion 61 by means of a pair of screws 68 that extend through the web of bracket portion 61 into hub 67 and base 64. The space between abutment surfaces 63 and 66 is slightly greater than the width of front wall 6 of standoff bracket 2 which aids in the mounting of the device on bracket 2.

The quick latch mounting device shown in FIGS. 6 and 7 also includes a clamping member 69 carried by base 64 and slidably movable relative thereto between a first engaged position that secures the mounting member in a clamped position and a second disengaged position that releases the mounting member to an unclamped position. Clamping member 69 is channel-shaped and includes a pair of elongate side legs 70 interconnected by a web 71 between their front edges. Legs 70 are parallel to one another and spaced apart such that their inner width is substantially equal to the width of base 64, as seen best in FIG. 7, and are disposed between the sides of base 64 and side walls 5 of bracket 2. Thus, legs 70 are adjacent to the sides of base 64 and extend parallel thereto. Each leg 70 includes a pair of slots 72 formed therein, one at its upper end and the other at its lower end. As shown best in FIG. 6, slots 72 are disposed at an oblique angle of about 8° with respect to front wall 6, and are dimensioned to receive headed pins 65. The edges of slots 72 define sliding surfaces which slidably engage the outer surfaces of headed pins 65 to define oblique sliding surfaces 73 in which clamping member 69 slidably moves. Clamping member 69 includes a wedge surface 74 defined by its outer surface that extends parallel to abutment surfaces 63 and 66 and front wall 6 of standoff bracket 2. Clamping member 69 also includes a pair of spaced apart plate members 75 extending parallel to legs 70 and connected to its top edge for coincident movement therewith.

The quick latch mounting shown in FIG. 6 and 7 also includes an actuator means carried by base 64 and rotatably or pivotally mounted thereon. The actuator means is operable upon rotation to move clamping member 69 between its engaged and disengaged positions. The actuator means includes an actuator member 76 in the form of an elongate lever having a pivotal connection 77 at its inner end to the top of base 64 and extending outwardly therefrom. Lever 76 includes an opening 78 formed therethrough at its outer end through which extends a component (not shown) of a hot stick for manipulating lever 76. Lever 76 is coupled or linked to plate members 75 on clamping member 69 by means of a pair of coupling members 79. As shown best in FIG. 7, each coupling member 79 is pivotally connected at its upper end to lever 76 and at its lower end to one of the plate members 75, and are disposed on opposite sides of lever 76. Thus, as lever 76 is rotated or pivoted about connection 77 upwardly to an inoperative position and downwardly to an operative position, clamping member 69 will also move respectively between its disengaged and engaged positions.

A latching means is also provided for releasably holding lever 76 in its operative position. The latching means includes a bent arm 80 which extends through an opening in lever arm 76 and which has a pivotal connection 81 at its inner end on base 64. Arm 80 includes a plurality of serrated edges 82 which engage a pawl member 83 on lever 76. A coil spring 84 disposed about pivotal connection 81 biases arm 80 outwardly or in a counterclockwise direction as shown in FIG. 6.

In operation, the mounting member for bushing 1 is shown in FIGS. 6 and 7 in its clamped position, and clamping member 69 is shown in its engaged position. In order to move clamping member 69 to its disengaged position and the mounting member to its unclamped position, a lineman using a hot stick moves the outer end of arm 80 inwardly or clockwise to disengage pawl member 83 from serrated edges 82 and then rotates lever 76 upwardly. Movement of lever 76 upwardly releases the pressure applied by wedge surface 74 against the inside of wall 6 of standoff bracket 2. This enables clamping member 69 to be slid along interfaces 73 to release the mounting member to its unclamped position. The mounting member, busing 1, and clamping member 69 may then be removed as a unit from standoff bracket 2.

In order to clamp bushing 1 on standoff bracket 2, the reverse procedure is performed. In order to accomplish this, the mounting member is slid down over the top edge of front wall 6 of standoff bracket 2 so that front wall 6 is positioned between abutment surface 63 and wedge surface 74. At this point, neither abutment surface 63 nor wedge surface 74 bears tightly against the sides of front wall 6, but instead are loosely positioned with respect thereto. Lever 76 is then rotated in a counterclockwise direction downwardly to the position shown in FIG. 6 so that clamping member 69 moves downwardly. As clamping member 69 moves downwardly, pins 65 slide in slots 72 along interfaces 73 to force wedge surface 74 to engage the inside surface of front wall 6 of bracket 2. This action forces bushing 1 on its mounting member inwardly until abutment surface 63 engages and bears against the outside surface of front wall 6 to firmly hold bushing 1 in its mounting member to standoff bracket 2. Bushing 1 and its mounting member are moved horizontally in a plane that is transverse to the vertical plane of movement of clamping member 69 and lever 76. Pins 65 thus act as reaction members to move bushing 1 and its mounting member into clamped positions. As in the other embodiments described herein, this action eliminates any tilting or tipping of the outer end of bushing 1.

A quick latch mounting device for securing a standoff device to a standoff bracket has been illustrated and described. Although three specific embodiments of the present invention have been illustrated and described, other embodiments may also be developed within the scope of the present invention. Additionally, numerous components may be substituted for those specifically described herein.

Various modes of carrying out the invention are contemplated as being within the scope of the following claims particularly pointing out and distinctly claiming the subject matter which is regarded as the invention.

I claim:

1. A quick latch mounting device for securing a standoff device to a standoff bracket, the combination comprising:

actuator means including an actuator member movable in a first plane;

a mounting member attachable to a standoff device and movable in a second plane transverse to said first plane between a first position clamped to a standoff bracket and a second position unclamped with respect to a standoff bracket; and a clamping member operatively coupled to said actuator member and said mounting member and operable upon movement of said actuator member to translate the movement of said actuator member in said first plane into the movement of said mounting member in said second plane.

2. The device of claim 1, wherein said actuator member includes cam means rotatably mounted on said mounting member between operative and inoperative positions and engageable in its operative position with said clamping member.

3. The device of claim 1, wherein said actuator member includes lever means pivotally mounted on said mounting member between operative and inoperative positions and including coupling means coupling said lever means to said clamping member.

4. The device of claim 3, further including latching means for releasably holding said lever means in said operative position.

5. The device of claim 1, wherein said mounting member includes an abutment surface engageable with a surface of said standoff bracket in said clamped position.

6. The device of claim 1, wherein said clamping member is carried by said mounting member and slidably moveable relative thereto along an oblique sliding interface formed between said clamping and mounting members.

7. The device of claim 6, wherein one of said clamping and mounting members includes an oblique sliding surface and the other of said clamping and mounting members includes a reaction member having a surface coacting with said oblique surface to form said oblique sliding interface.

8. A quick latch mounting device for securing a standoff device to a standoff bracket, the combination comprising:

a mounting member including a bracket portion attachable to a standoff device that includes a first abutment surface and a mounting portion connected to said bracket portion that includes a second abutment surface spaced from and in opposition to said first abutment surface, said mounting member movable between a first clamped position wherein one of said abutment surfaces engages and bears against a surface of a standoff bracket to firmly hold the mounting member and standoff bracket together and a second unclamped position wherein said one abutment surface is disengaged from a standoff bracket;

a clamping member carried by said mounting member and slidably moveable relative thereto between a first engaged position that secures said mounting member in said clamped position and a second disengaged position that releases said mounting member to said unclamped position; and actuator means movably mounted on said mounting member and operable upon movement to move said clamping member between said first engaged position and said second disengaged position.

9. The device of claim 8, wherein said actuator member includes cam means rotatably mounted on said mounting member between operative and inoperative positions and engageable in its operative position with said clamping member.

10. The device of claim 8, wherein said actuator member includes lever means pivotally mounted on said mounting member between operative and inoperative positions and including coupling means coupling said lever means to said clamping member.

11. The device of claim 10, further including latching means for releasably holding said lever means in said operative position.

12. The device of claim 8, wherein one of said clamping and mounting members includes an oblique sliding surface and the other of said clamping and mounting members includes a reaction member having a surface coacting with said oblique surface to form an oblique sliding interface between said clamping and mounting members.

13. The device of claim 12, wherein said clamping member includes a slot formed therein that defines said oblique sliding surface, and said mounting member includes a pin member receivable in said slot that defines said reaction member.

14. Standoff apparatus for securing a standoff device to a support member, the combination comprising:

a standoff bracket including a wall having a pocket formed therein;

a mounting member attachable to a standoff device and receivable within said pocket, said mounting member including a pair of opposing, spaced apart abutment surfaces disposed on opposite sides of said wall, said mounting member movable with respect to said standoff bracket between a first clamped position wherein one of said abutment surfaces engages and bears against one side of said wall to firmly hold the mounting member and standoff bracket together and a second unclamped position wherein said one abutment surface is disengaged from said one side of said wall;

a clamping member carried by said mounting member and slidably moveable relative thereto along an oblique sliding interface formed between said clamping member and said mounting member between a first engaged position wherein a wedge surface of said clamping member engages the other side of said wall to secure said one abutment surface against said one side of said wall and a second disengaged position wherein said wedge surface is disengaged from the other side of said wall to release said one abutment surface from said one side of said wall; and actuator means movably mounted on said mounting member and operable upon movement to move said clamping member between said first engaged position and said second disengaged position.

15. The apparatus of claim 14, wherein said wedge surface moves in a plane transverse to said wall.

16. The apparatus of claim 15, wherein said actuator means includes a rotatable actuator member.

17. The apparatus of claim 14, wherein said wedge surface is disposed in opposition to said one abutment surface.

18. The device of claim 16, wherein said actuator member includes cam means rotatably mounted on said mounting member between operative and inoperative positions and engageable in its operative position with said clamping member.

19. The device of claim 16, wherein said actuator member includes lever means rotatably mounted on said mounting member between operative and inoperative positions and including coupling means coupling said lever means to said clamping member.

20. The device of claim 19, further including latching means for releasably holding said lever means in said operative position.

* * * * *